(12) United States Patent
Huang

(10) Patent No.: US 8,746,656 B2
(45) Date of Patent: Jun. 10, 2014

(54) AUXILIARY OPERATIVE HANDLE OF ROTATIONAL BATHING FAUCET

(75) Inventor: Li-Chen Huang, Changhua (TW)

(73) Assignee: Alexander Yeh Industry Co. Ltd., Changhua (TW)

( * ) Notice: Subject to any disclaimer, the term of this patent is extended or adjusted under 35 U.S.C. 154(b) by 0 days.

(21) Appl. No.: 13/273,130

(22) Filed: Oct. 13, 2011

(65) Prior Publication Data

US 2013/0092857 A1    Apr. 18, 2013

(51) Int. Cl.
 *F16K 31/00* (2006.01)
(52) U.S. Cl.
 USPC .......................................... 251/292; 251/293
(58) Field of Classification Search
 USPC ............ 251/292, 291, 293, 231; 16/422, 426, 16/427; 137/801; 4/675–678; 74/523, 545
 See application file for complete search history.

(56) References Cited

U.S. PATENT DOCUMENTS

| | | | | |
|---|---|---|---|---|
| 1,448,720 A * | 3/1923 | Bettien | ......................... | 251/292 |
| 1,653,956 A * | 12/1927 | Glauber | ............................ | 4/570 |
| 1,878,569 A * | 9/1932 | Zolleis | ............................ | 74/548 |
| 4,037,489 A * | 7/1977 | Morel | ............................ | 74/548 |
| 4,266,320 A * | 5/1981 | Grant | ............................ | 16/427 |
| 5,231,731 A * | 8/1993 | Jones, Jr. | ......................... | 16/412 |
| 5,511,286 A * | 4/1996 | Williams et al. | ................ | 16/422 |
| 5,520,210 A * | 5/1996 | Barton | ............................ | 137/296 |
| 5,557,955 A * | 9/1996 | Kinsella | ............................ | 70/177 |
| 6,186,475 B1 * | 2/2001 | Selepouchin | ................. | 251/293 |
| 6,354,322 B2 * | 3/2002 | Clark | ............................ | 137/312 |
| 6,457,208 B1 * | 10/2002 | Keith | ............................ | 16/422 |
| 7,178,786 B2 * | 2/2007 | Turnau et al. | ................. | 251/309 |
| 7,806,023 B2 * | 10/2010 | Fowler | ............................ | 74/527 |

* cited by examiner

*Primary Examiner* — John K Fristoe, Jr.
*Assistant Examiner* — Andrew J Rost
(74) *Attorney, Agent, or Firm* — Che-Yang Chen; Law Office of Michael Chen

(57) ABSTRACT

An auxiliary operative handle of a rotational bathing faucet includes an operative handle including a conjugating end having a plurality of conjugating protruding hooks extending from the conjugating end; an elongated end extended from the one side of the conjugating end; and a circular wedging slot defined between the conjugating protruding hooks and the elongated end, wherein the operative handle is coupled with a knob of the faucet through the wedging slot and forms a secure position when the conjugating protruding hooks are conjugated with an outer periphery of the knob, so that the elongated end is used as a lever arm to rotate towards left or right, and a user is able to operate the faucet with less force. Also, the user gets to know whether the water is on or off by the position of the elongated end to precisely control the amount of the water.

4 Claims, 13 Drawing Sheets

AUXILIARY OPERATIVE HANDLE OF ROTATIONAL BATHING FAUCET

FIELD OF THE INVENTION

The present invention relates to an auxiliary handle, and more particularly refers to an operative handle coupled with bathing faucet to enhance convenience and practicability when water is released from the faucet.

BACKGROUND OF THE INVENTION

Conventionally, bathroom faucet is coupled with rotational switch for users to use, and most rotational switches have one bulky cylindrical knob with shallow slots on the outer surface for the user to hold. When in use, the user holds and covers the knob with the fingers, and then rotates the knob to switch water on and off. However, when the rotational switch is not in use for a long period of time, it becomes tight due to filthy substances in the water and degraded parts of the switch. Under this situation, it is even more difficult for the elderly and children who do not have enough strength in their hands. Moreover, since the knob is a bulky and cylindrical, it is difficult to know the current state of the water, especially the temperature and amount of the water. If the user can not precisely control the temperature and the amount of water, the user may either be burned by hot water or experience cold water. These are disadvantages of conventional bathroom faucet with rotational switch.

SUMMARY OF THE INVENTION

In order to solve the problems presented above, the present invention provides an auxiliary operative handle of a bathing faucet that includes a operative handle having a conjugating end that has a plurality of conjugating protruding hooks extending from the conjugating end. The other end is an elongated end and a circular wedging slot is defined between the conjugating protruding hooks and the elongated end.

The main object of the present invention is that the operative handle is conjugated with the knob of the faucet and the elongated end of the operative handle forms a rotational level arm, so that the elongated end can be used directly to use less force to rotate the knob, and it is especially advantageous for the elderly and children.

Another object of the present invention is that when the operative handle is conjugated with the knob, the elongated end can indicate the status of the water, so the user can precisely control the temperature and amount of the water.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
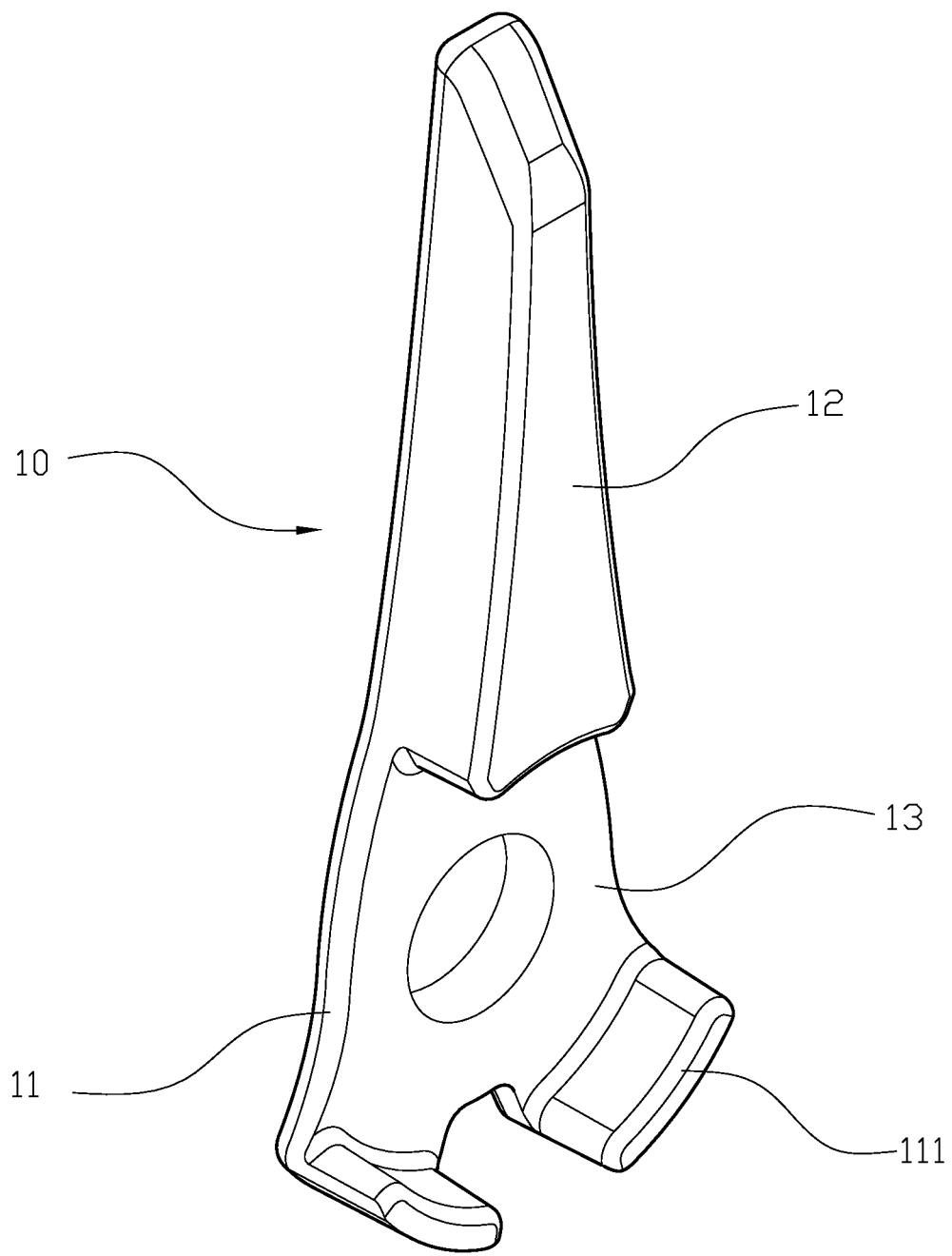
FIG. 1 illustrates a three-dimensional assembled view in the present invention.

In order to further understand the goal, characteristics and effect of the present invention, a number of embodiments along with the drawings are illustrated as following:

Referring to FIG. 1, an auxiliary operative handle of a rotational bathing faucet includes an operative handle (10) that has a conjugating end (11) having a plurality of conjugating protruding hooks (111) extending from the conjugating end (11). The other end of the operative handle (10) has an elongated end (12), and a circular wedging slot (13) is defined between the conjugating protruding hooks (11) and the elongated end (12) to form the auxiliary operative handle of a rotational bathing faucet.

Figure 2:
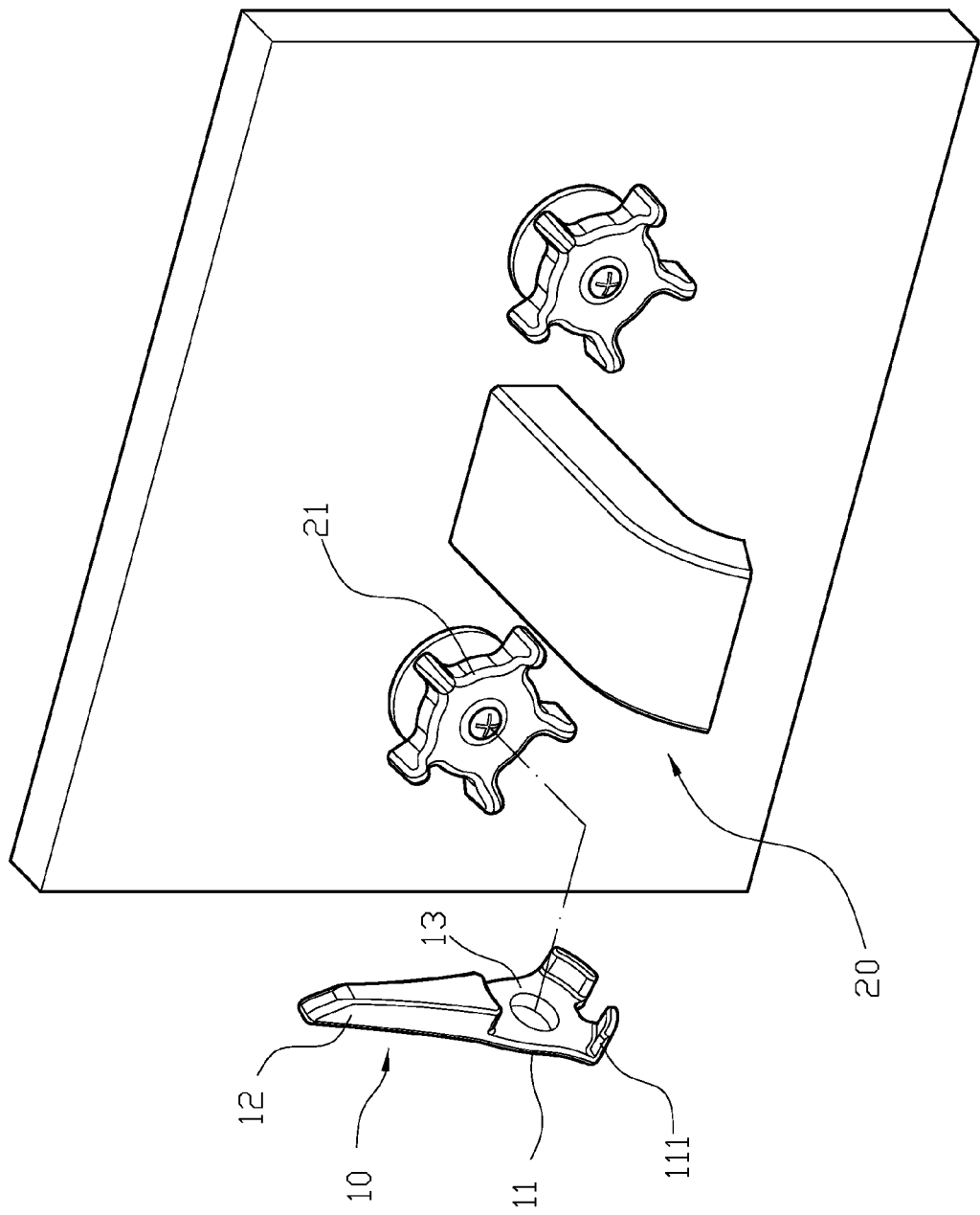
FIG. 2 illustrates an exploded view of one embodiment in the present invention.
Figure 3:
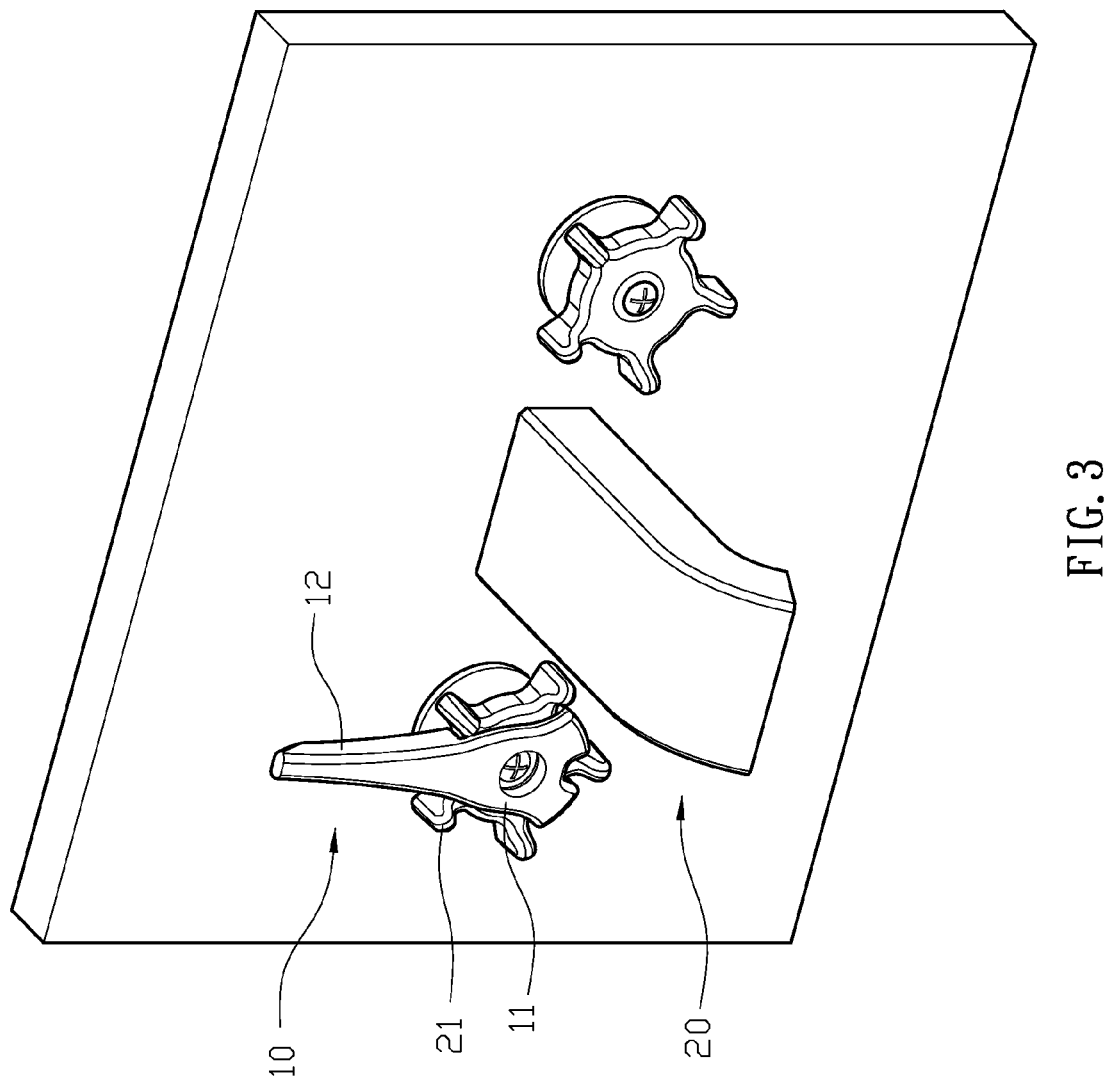
FIG. 3 illustrates an assembled view of one embodiment in the present invention.
Figure 4:
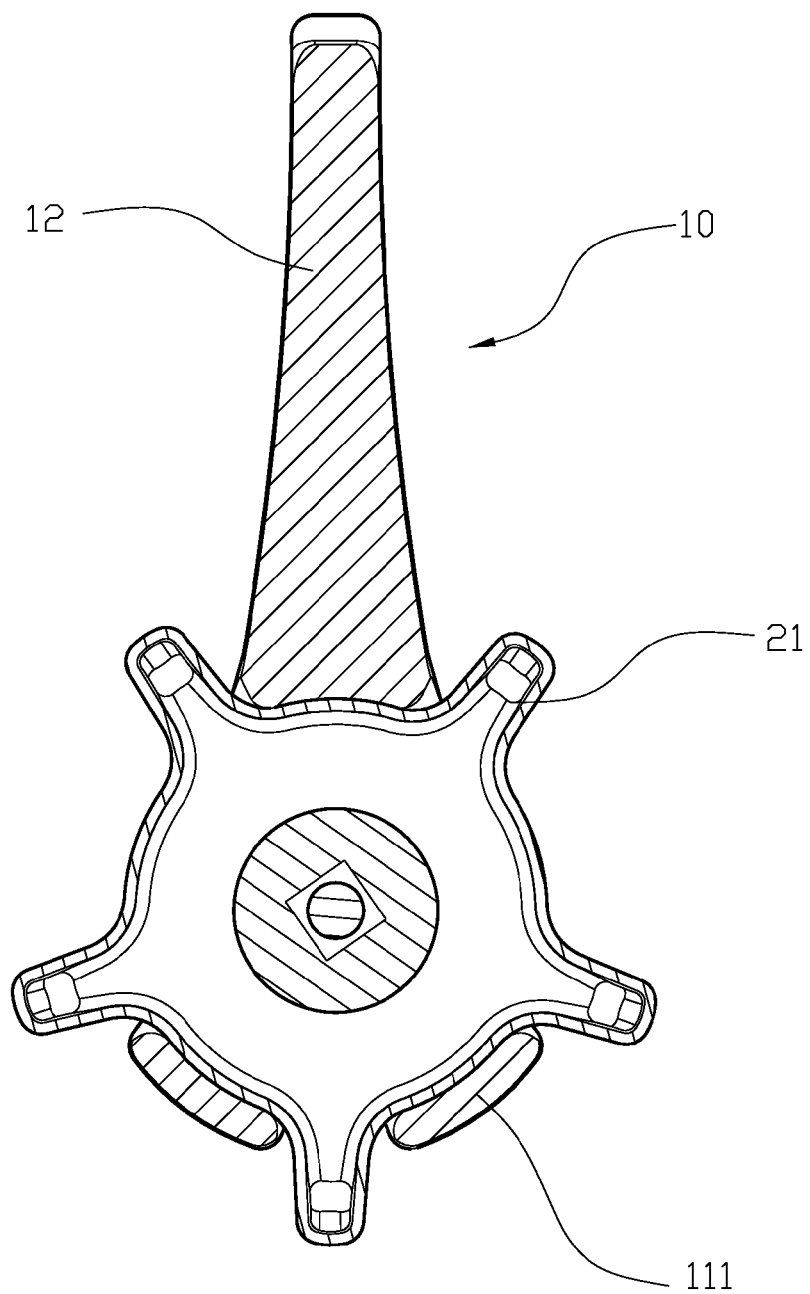
FIG. 4 illustrates a sectional view of the conjugating status in the present invention.
Figure 5:
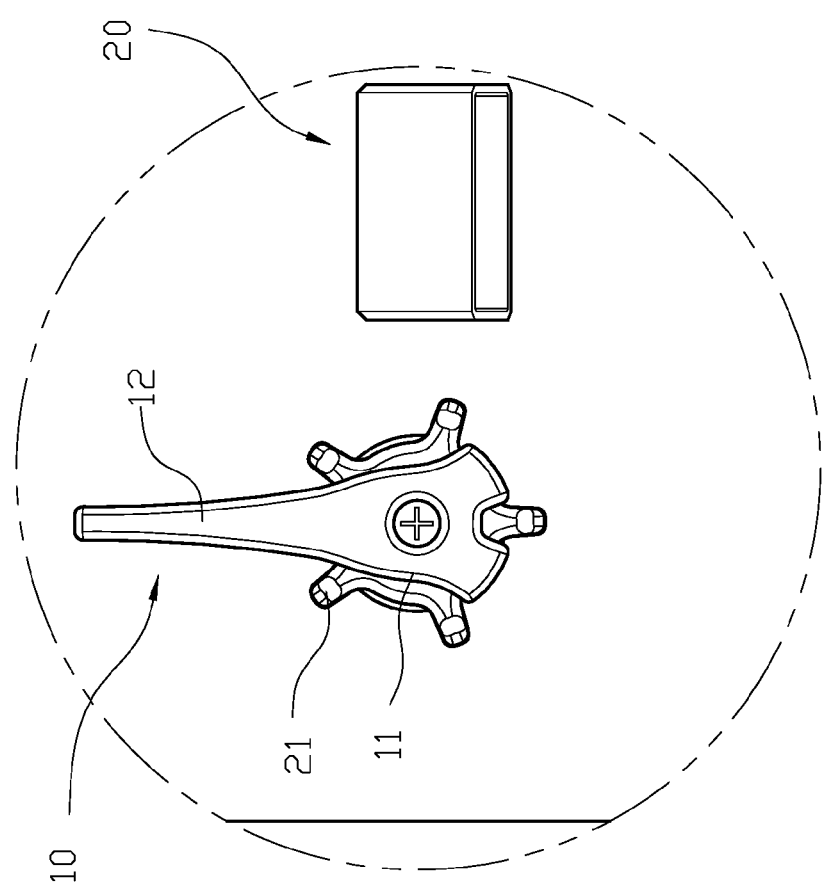
FIG. 5 illustrates a schematic view of the status when the water is off in the present invention.
Figure 6:
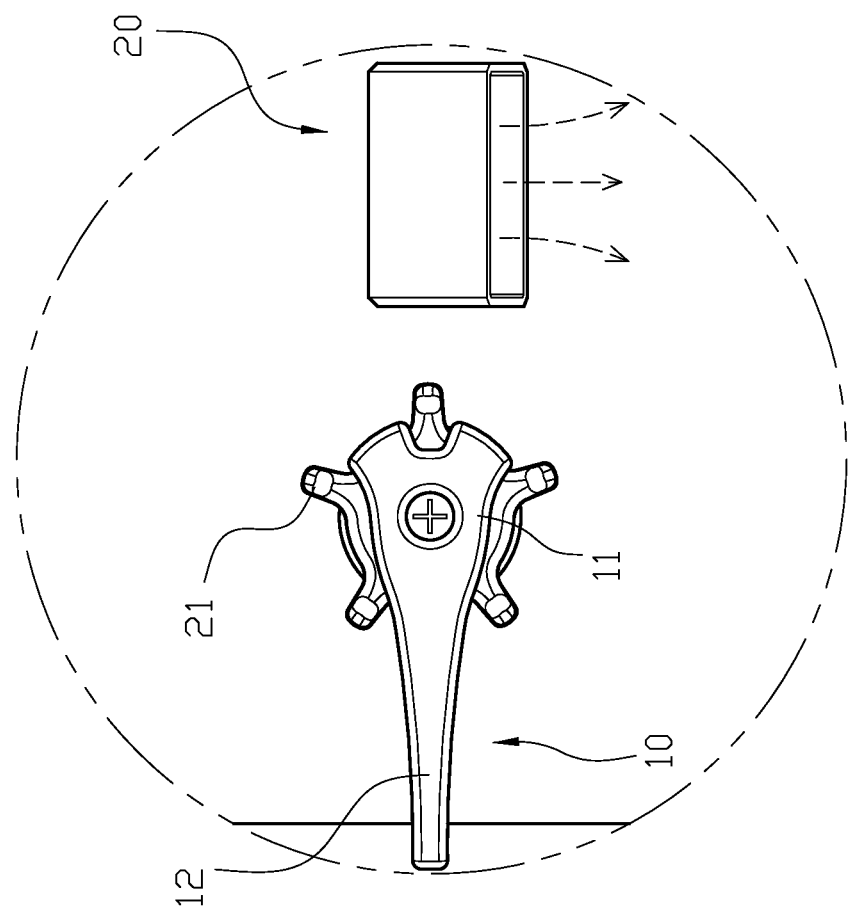
FIG. 6 illustrates a schematic view of the status when the water is half-off in the present invention.
Figure 7:
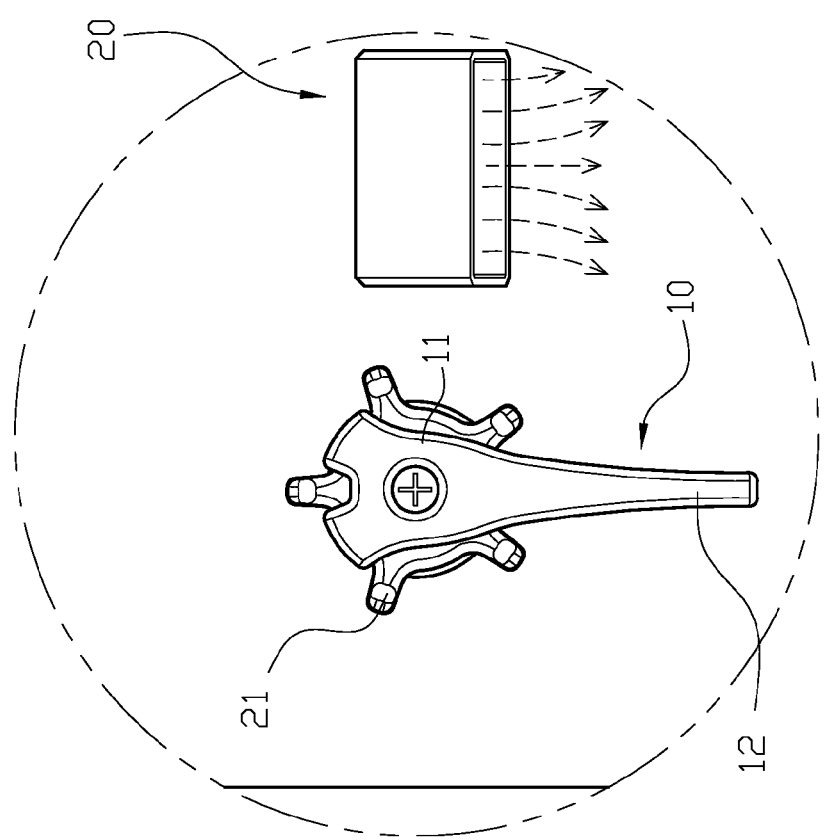
FIG. 7 illustrates a schematic view of the status when the water is on in the present invention.
Figure 8:
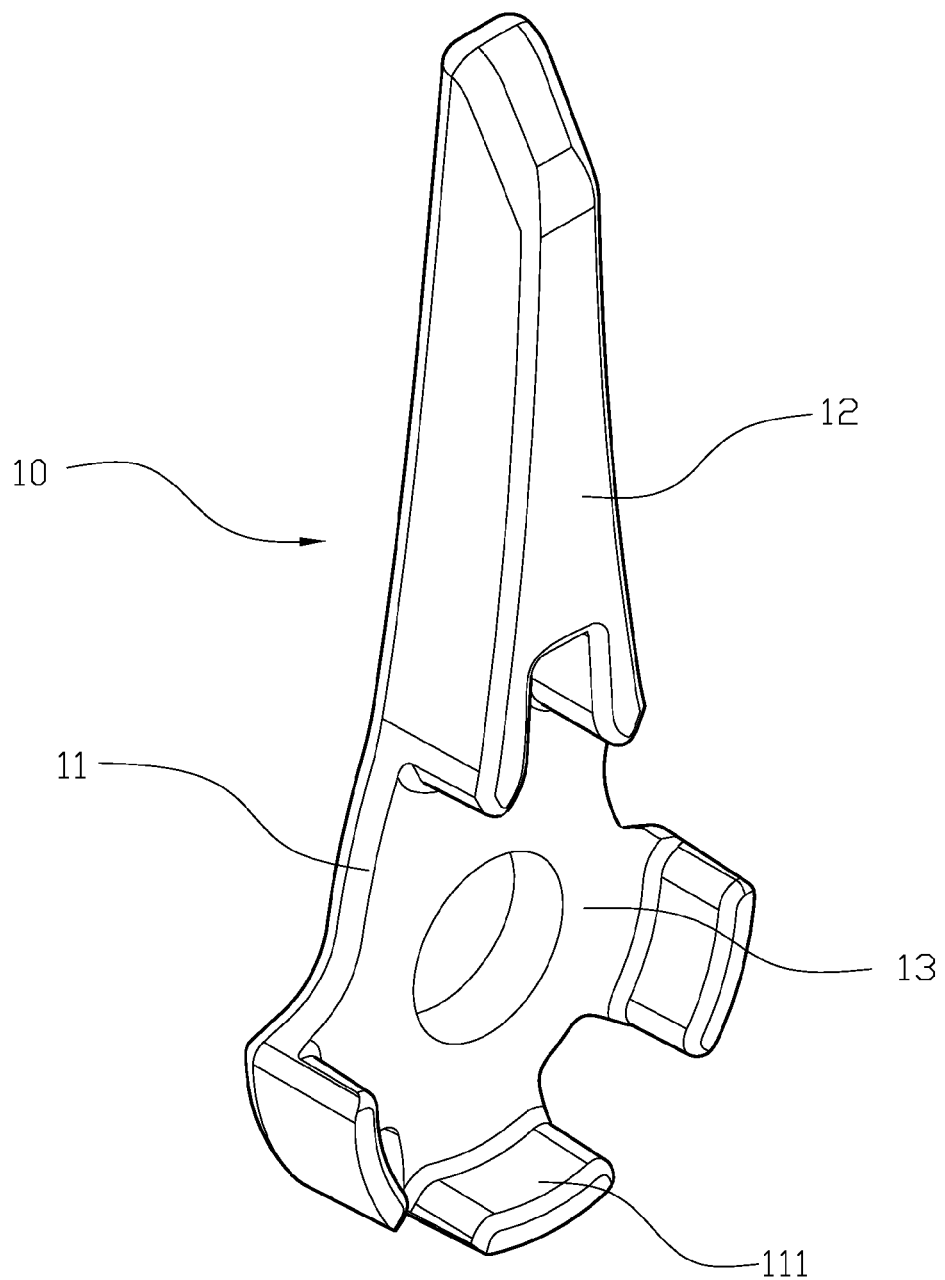
FIG. 8 illustrates a three-dimensional view of three protruding hooks in the present invention.
Figure 9:
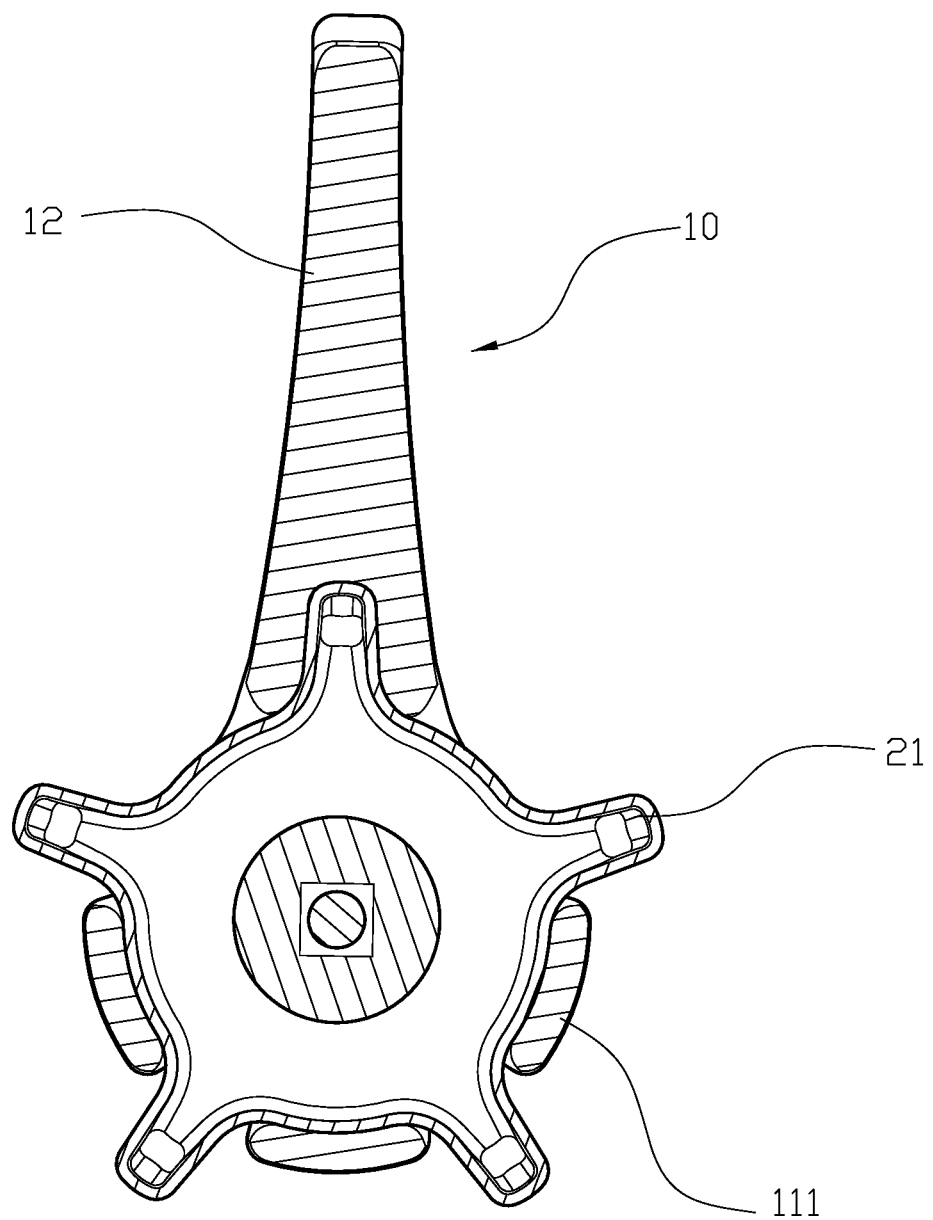
FIG. 9 illustrates a sectional view of three protruding hooks in the present invention.
Figure 10:
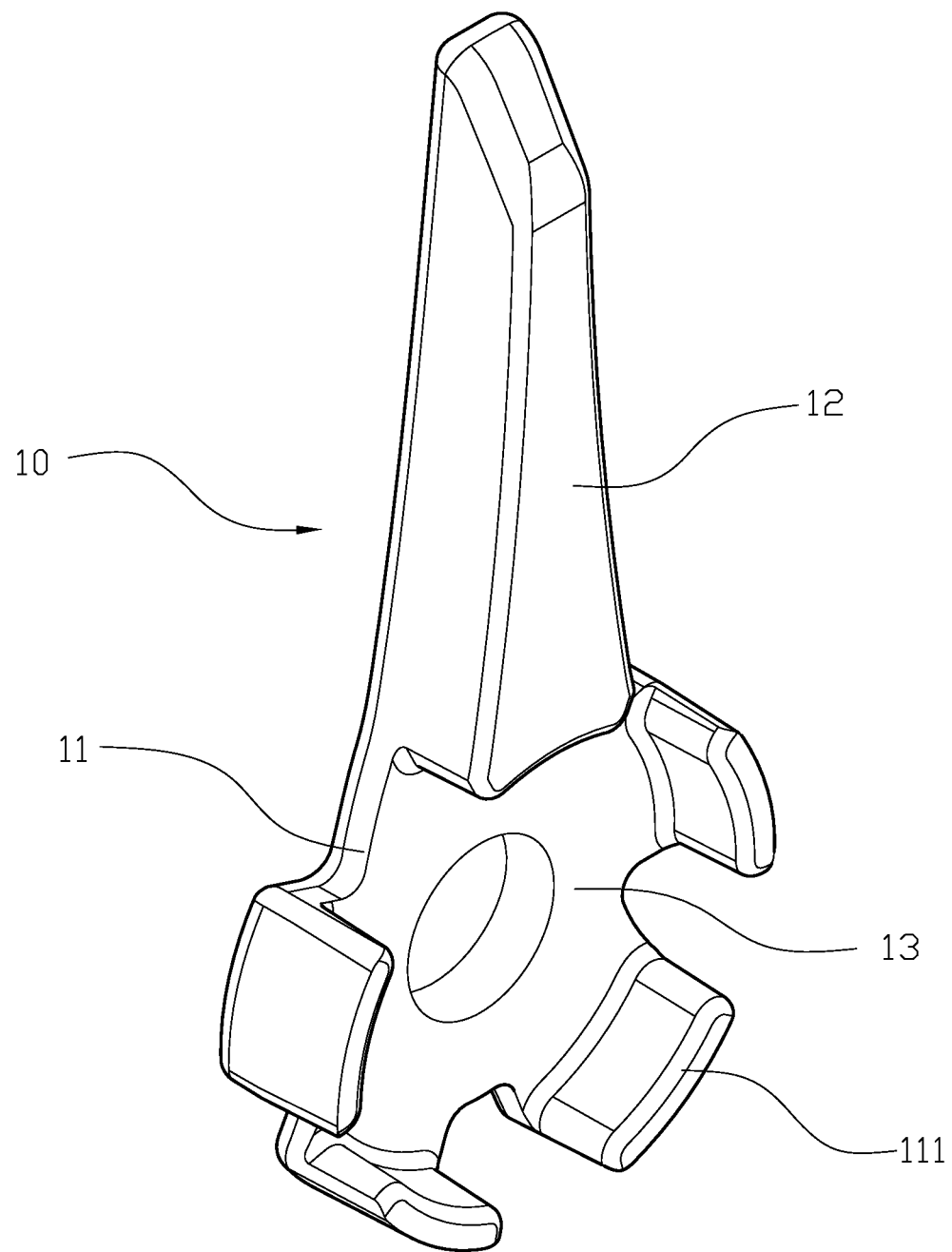
FIG. 10 illustrates a three-dimensional view of four protruding hooks in the present invention.
Figure 11:
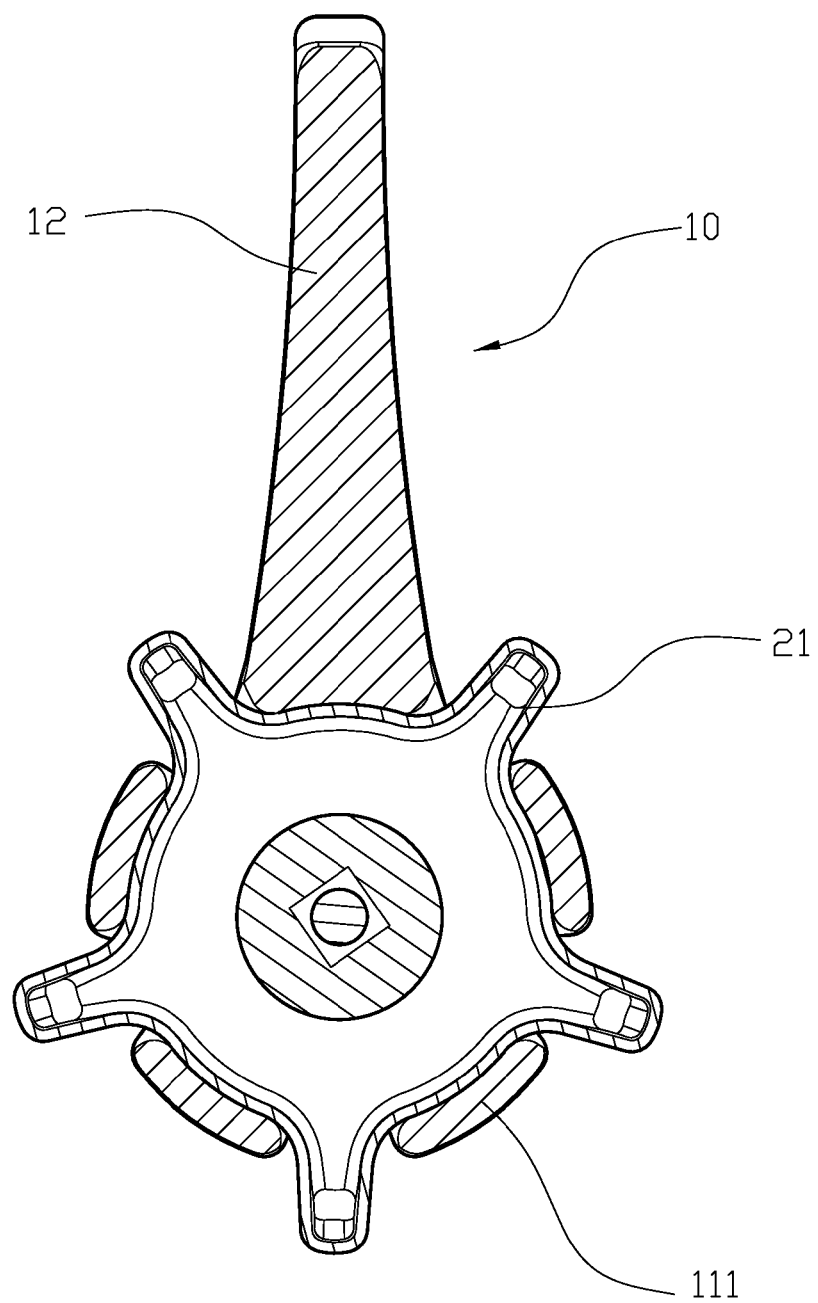
FIG. 11 illustrates a sectional view of four protruding hooks in the present invention.

Referring to FIGS. 2, 3 and 4, when the operative handle is in use, the operative handle (10) is coupled with a faucet (20) and a knob (21). In one embodiment, the conjugating end (11) of the operative handle (10) forms two engaging protruding hooks (111) at an outer periphery and the operative handle (10) is disposed on the knob (21) through the circular wedging slot (13) of the conjugating end (11) to form a secure position by conjugating the engaging protruding hooks (111) and the outer periphery of the knob (21), so that the elongated end (12) is formed when the knob (21) is conjugated with the operative handle (10). Since the elongated end (12) forms a level arm to rotate toward right or left, the user can operate the knob (21) with less force, so that the elderly and children can easily operate the knob (21) even though the knob may be tight and they do not have too much hand strength. Furthermore, the elongated end (12) of the operative handle (10) can indicate the status of the knob (21) regarding whether it is on. For example, when the elongated end (12) is pointing upwards, it means the water is off (see FIG. 5). When the elongated end (12) is pointing at ninety degrees, it means the switch is half-on (half-off) and the amount of water is smaller (see FIG. 6). When the elongated end (12) is pointing downwards, it means the water is on and the amount of water is large (see FIG. 7).

As shown in FIGS. 8, 9, 10 and 11, three conjugating protruding hooks (111) or four conjugating protruding hooks (111) can be formed at outer periphery of the conjugating end (11) of the operative handle (10), so when the operative handle (10) is conjugated with the knob (21) through the circular wedging slot (13) on the conjugating end (11), the conjugating strength can be enhanced when the number of the conjugating protruding hooks (111) increase to further enhance precision of rotational movement.

Figure 12:
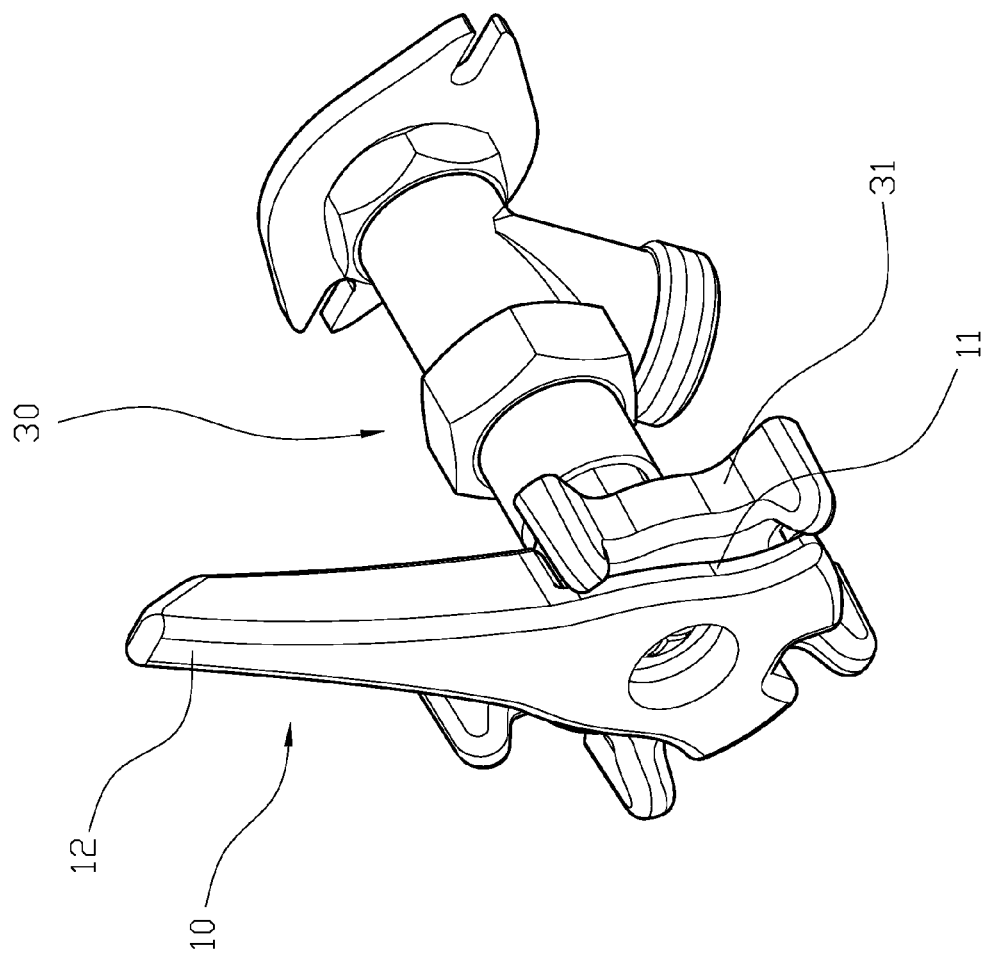
FIG. 12 illustrates an exploded view of another embodiment in the present invention.
Figure 13:
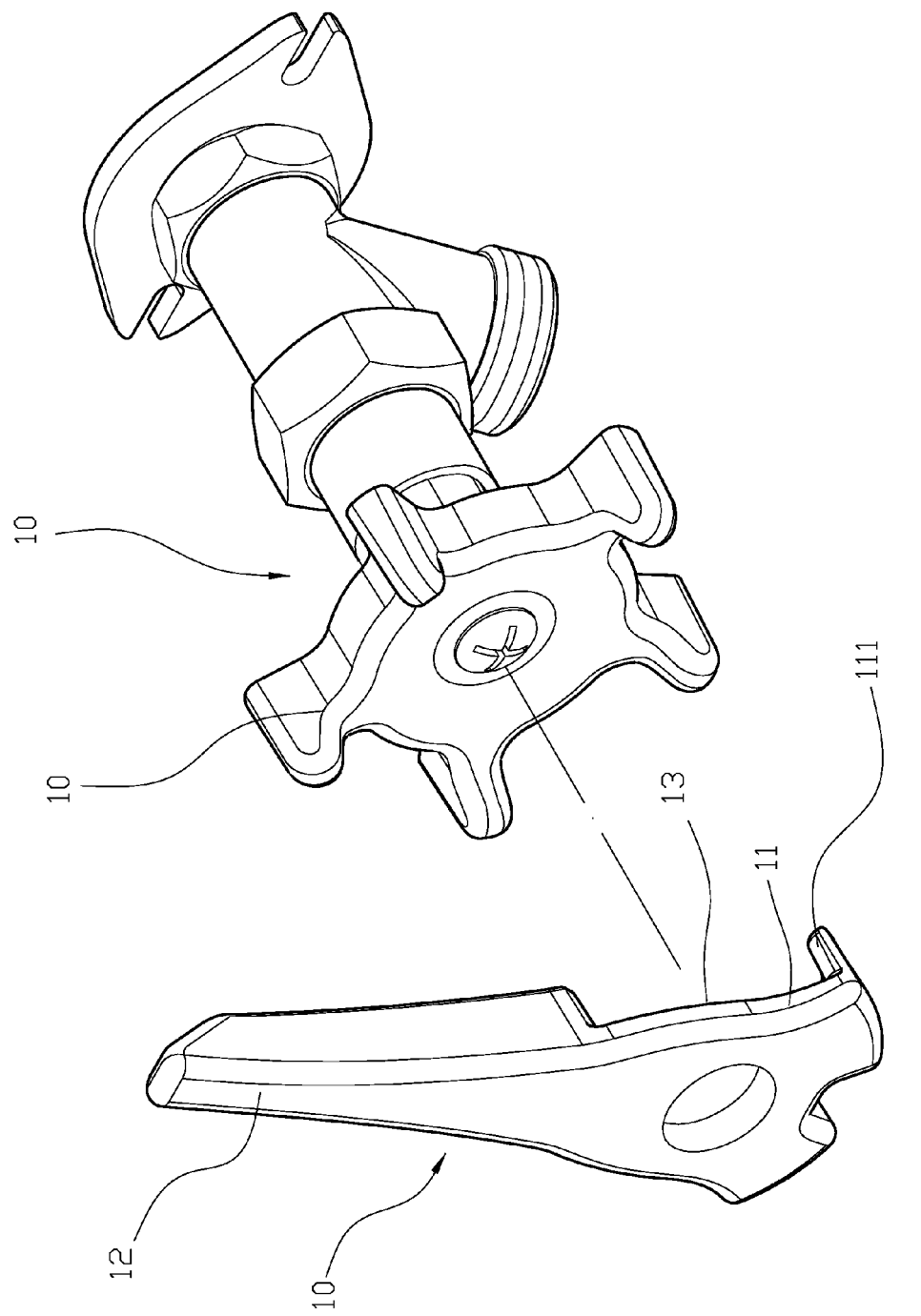
FIG. 13 illustrates an assembled view of another embodiment in the present invention.

Referring to FIGS. 12 and 13 regarding the operative handle (10) coupled with an outside faucet (30), the circular wedging slot (13) of the conjugating end (11) of the operative handle (10) is conjugated with a knob (31) of the outside faucet (30), so that the secure positioning can be formed when the conjugating protruding hooks (111) are conjugated with the outer periphery of the knob (31) and the elongated end (12) can be used to control on and off of the outside faucet (30).

According to the structure in the abovementioned embodiments, the present invention has the following advantages: (a) the operative handle (10) is conjugated with the knob (21) of the faucet (20) and the elongated end (12) of the operative handle (10) forms a rotational level arm, so that the elongated end (12) can be used directly to use less force to rotate the knob (21), and it is especially advantageous for the elderly and children; and (b) when the operative handle (10) is conjugated with the knob (21), the elongated end (12) can indicate the status of the water, so the user can precisely control the temperature and amount of the water.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. An auxiliary operative handle of a rotational bathing faucet comprising an operative handle including a conjugating end having a plurality of conjugating protruding hooks extending from the conjugating end; an elongated end extended from the one side of the conjugating end; and a circular wedging slot defined between the conjugating protruding hooks and the elongated end, wherein the operative handle is coupled with a knob of the faucet through the wedging slot to enclose the knob through an outer periphery thereof to form a secure position, and the conjugating protruding hooks are used to further conjugate with said outer periphery of the knob to enhance conjugating strength, so that the elongated end is used as a lever arm to rotate towards left or right, and a user is able to operate the faucet with less force, wherein the elongated end is used to indicate the status of the knob of the faucet to determine the amount and temperature of the output water, and wherein a U-shaped recessed portion is formed on the elongated end facing one of the conjugating protruding hooks across the circular wedging slot.

2. The auxiliary operative handle of a rotational bathing faucet of claim 1, wherein two conjugating protruding hooks are formed at an outer periphery of the conjugating end of the operative handle.

3. The auxiliary operative handle of a rotational bathing faucet of claim 1, wherein three conjugating protruding hooks are formed at an outer periphery of the conjugating end of the operative handle.

4. The auxiliary operative handle of a rotational bathing faucet of claim 1, wherein four conjugating protruding hooks are formed at an outer periphery of the conjugating end of the operative handle.

* * * * *